(12) United States Patent
Wang

(10) Patent No.: US 7,006,901 B2
(45) Date of Patent: Feb. 28, 2006

(54) COMPUTERIZED AUTOMATED DYNAMIC CONTROL SYSTEM FOR SINGLE-TRACK VEHICLES

(76) Inventor: Everett X. Wang, 1185 Keystone Ct., San Jose, CA (US) 95132

( * ) Notice: Subject to any disclaimer, the term of this patent is extended or adjusted under 35 U.S.C. 154(b) by 52 days.

(21) Appl. No.: 10/299,612

(22) Filed: Nov. 18, 2002

(65) Prior Publication Data

US 2004/0098185 A1 May 20, 2004

(51) Int. Cl.
*G06F 7/00* (2006.01)
*B62D 61/00* (2006.01)

(52) U.S. Cl. .............................. 701/1; 701/36; 701/41; 180/218; 180/222

(58) Field of Classification Search .................. 701/36, 701/41, 43, 1; 280/763.1, 764.1, 208, 302, 280/293, 298, 748, 755, 756, 757; 180/222, 180/209, 219, 291, 218, 221, 227; 340/432, 340/439–441
See application file for complete search history.

(56) References Cited

U.S. PATENT DOCUMENTS

| 4,181,190 A | * | 1/1980 | Yang ........................... 180/219 |
| 4,660,146 A |   | 4/1987 | Kubo ............................ 701/79 |
| 4,691,798 A | * | 9/1987 | Engelbach ................... 180/209 |
| 4,875,536 A | * | 10/1989 | Saur et al. .................. 180/6.32 |
| 4,903,857 A |   | 2/1990 | Klopfenstein |
| 4,989,922 A |   | 2/1991 | Pickenhahn et al. ........ 303/137 |

(Continued)

FOREIGN PATENT DOCUMENTS

WO WO 00/34112 A1 * 6/2000

OTHER PUBLICATIONS

PCT Search Report for International application No. PCT/US 03/35335, May 26, 2004.
Arthur E. Bryson Jr. "Optimal Control—1950 to 1985", IEEE Control Systems, pp. 26–33, Jun., 1996.
Ahmed A. Shabana, Dynamics of Multibody Systems, $2^{nd}$ edition, Cambridge University press ISBN 0–521–59446–4, 1998.
Vittore Cossaltar, et al., "A Motorcycle Multi–Body Model for Real Time Simulations Based on Natural Coordinates Approach", Vehicle System Dynamics, vol. 37, No. 6, 2002, pp. 423–447.
H. Kwakenaak, et. Al., "Linear Optimal Control Systems", Wiley–Interscience, 1972.
Robert F. Stengel, Optimal Control and Estimation, Dover, ISBN 0–486–68200–5, 1994, Chapter 2.3, pp. 69–84 and Chapter 5.1, pp. 421–430.
J. Rubi, et al., "Swing–up control problem for a self–erecting double inverted pendulum", IEE Proc.–Control Theory Appl., vol. 149, No. 2, Mar. 2002, pp. 169–175.
T. S. Liu et al., "Fuzzy Control Stabilization with Applications to Motorcycle Control", IEEE Transaction on System, Man, and Cybernetics–Part B: Cybernetics, vol. 26, No. 6, Dec. 1996, pp. 836–847.

(Continued)

*Primary Examiner*—Jacques H. Louis-Jacques
(74) *Attorney, Agent, or Firm*—Blakely, Sokoloff Taylor & Zafman LLP

(57) ABSTRACT

Various methods, apparatuses, and systems in which a single-track vehicle has a retractable auxiliary-support wheel assembly and a computer control system. In an embodiment, the single-track vehicle has an elongated body. The retractable auxiliary-support wheel assembly mounts on both sides of the elongated body. The computer control system analyzes signals from one or more sensors to dynamically balance the single-track vehicle.

12 Claims, 10 Drawing Sheets

U.S. PATENT DOCUMENTS

| | | | |
|---|---|---|---|
| 5,039,073 A | | 8/1991 | Reichard et al. ....... 267/140.13 |
| 5,107,950 A | * | 4/1992 | Horiike et al. .............. 180/219 |
| 5,181,740 A | | 1/1993 | Horn .......................... 280/753 |
| 5,217,087 A | * | 6/1993 | Ikegami et al. ............. 180/219 |
| 5,383,675 A | * | 1/1995 | Liebert ....................... 280/266 |
| 5,437,467 A | | 8/1995 | Patin ....................... 280/6.154 |
| 5,456,524 A | * | 10/1995 | Kashima et al. ............ 303/137 |
| 5,518,259 A | * | 5/1996 | Hall .......................... 280/43.2 |
| 5,625,336 A | * | 4/1997 | Yamamoto .................. 340/432 |
| 5,762,351 A | | 6/1998 | SooHoo ...................... 280/267 |
| 5,765,846 A | | 6/1998 | Braun ................. 280/124.103 |
| 5,820,439 A | * | 10/1998 | Hair, III ..................... 446/233 |
| 5,823,876 A | * | 10/1998 | Unbehand ................... 463/37 |
| 5,904,218 A | * | 5/1999 | Watkins ....................... 180/209 |
| 5,971,091 A | | 10/1999 | Kamen et al. ............. 180/218 |
| 6,170,847 B1 | * | 1/2001 | Pham ......................... 280/298 |
| 6,192,300 B1 | * | 2/2001 | Watarai et al. ................. 701/1 |
| 6,311,805 B1 | * | 11/2001 | Juan ......................... 188/24.16 |
| 6,349,246 B1 | | 2/2002 | Smith et al. ................... 701/1 |
| 6,407,663 B1 | | 6/2002 | Huggett ...................... 340/461 |
| 6,741,045 B1 | * | 5/2004 | Kitamura ..................... 318/14 |
| 2002/0057070 A1 | | 5/2002 | Thomsen et al. ........... 318/801 |

OTHER PUBLICATIONS

Chang–Yun Seong, et al., "Neural Dynamic Optimization for Control System–Part II: Theory", IEEE Transaction on Systems, Man, and Cybernetics, Part B: Cybernetics, vol. 31, No. 4, Aug. 2001, pp. 490–501.

Brink Dynamics, Moving Technology, www.brinkdynamics. com, pp. 2, printed on Nov. 29, 2004.

Standard–Eco, Specification Peraves W–18K5 Ecomobile 1000cm*, www.peraves.ch/standarde.htm, pp. 2, printed on Nov. 29, 2004.

* cited by examiner

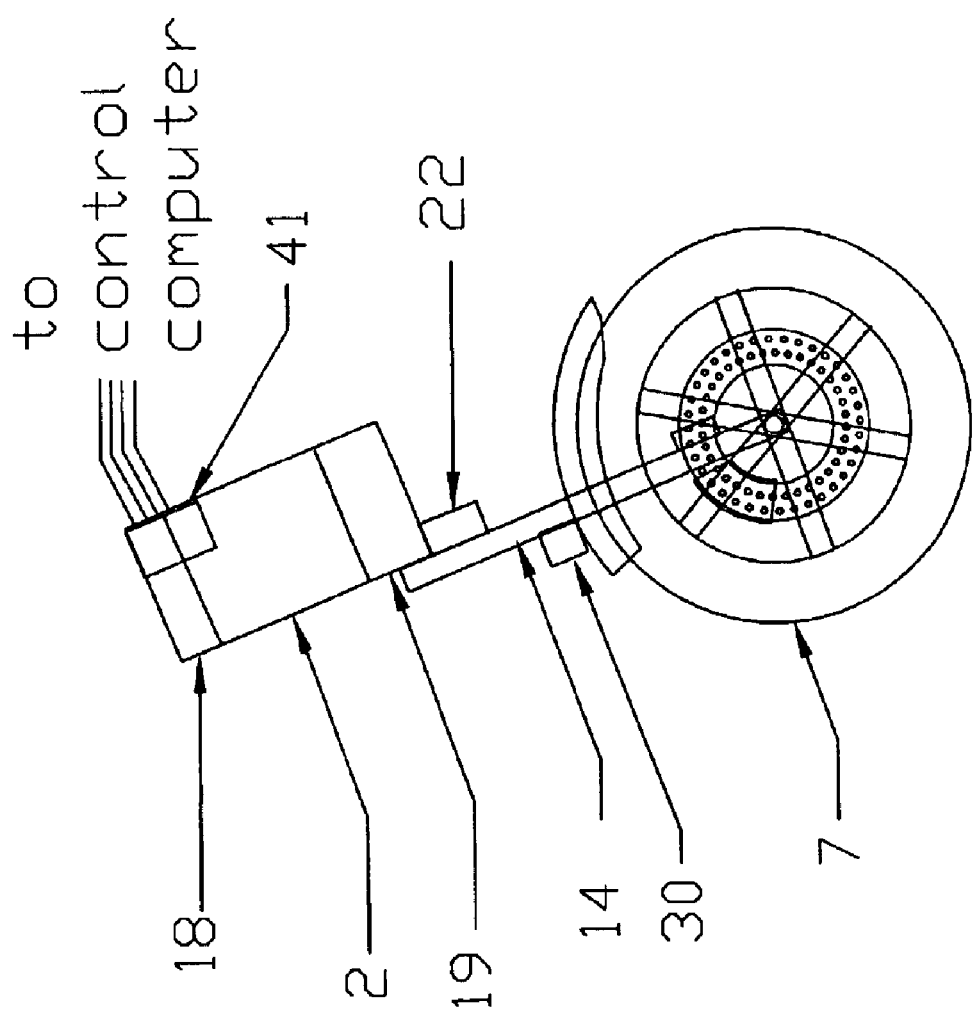

COMPUTERIZED AUTOMATED DYNAMIC CONTROL SYSTEM FOR SINGLE-TRACK VEHICLES

TECHNICAL FIELD

In general, embodiment of the invention may relate to a single track vehicle controlled through use of a control algorithms. In particular an aspect of an embodiment of the invention relates to automated steering control for achieving dynamic balancing of single-track vehicles.

BACKGROUND OF THE INVENTION

Generally, Single-track vehicles (motorcycles, scooters, mopeds and bicycles) enjoy significant advantage over dual-track vehicles (such as cars) in terms of handling (i.e. maneuverability, acceleration, slalom) and energy efficiency. It is obvious when we compare a typical single-track vehicle with a typical car: The payload to vehicle weight ratio is 1/20 for a car, while a typical single-track vehicle (i.e. motorcycle) has a payload to vehicle weight ratio of 1/2, a factor of 10 better. Although automobiles are typically a very popular choice for tens of millions of commuters everyday, it may be the most energy inefficient among all man made transportation tools. Carrying of single individual of 150 lb by a vehicle of 3000 lb is simply gross waste of precious energy resources. Due to their large front profile and four wheels, cars consume much of their power by the large aerodynamic drag force and large tire friction force at high speed. Cars are also much wider than single-track vehicles and need a relatively wide road to operate. As a result the road system occupies large land resource and is expensive to build for reasonable flow capability. Energy and time wasting, environment damaging traffic jams are frequent at large metropolitans during rush hours. The parking lots also have to be large enough to accommodate the vehicle sizes. All these contribute to large and wasteful land usage. The excessive weights of vehicles are also dangerous. Dual-track vehicles take much more brake force to stop them. In addition, dual-track vehicles also produce a much larger impact force in an accident. The energy, environment and land resource issues are compounding in the densely populated developing countries. The transportation needs of tens of billions of people cannot be met by automobiles due to the large burdens on the energy, environmental and land resources.

The tremendous reduction of body weight of a single-track vehicle makes its engine much more effective in propelling it to a reasonable acceleration and speed even with a much smaller engine power. Single-track vehicle can also be more energy efficient in reduction of aerodynamic-drag, which is a major energy consumption contributor at high speed. Since the front profile is much smaller than that of a typical car with an elongated body, single track-vehicle has much smaller aerodynamic drag force. Combining this with the fact that most single-track vehicles have two main wheels, single-track vehicle can cruise at high speed with much reduced energy consumption rate. They are also environmentally friendlier, use less road and parking resources and release less greenhouse gas. But typically, single-track vehicles require extensive skill to ride and are considerably more dangerous for inexperienced riders due to their intrinsic instability. As a result, the mass population does not realize the potential for high fuel efficiency, environmental safety and high performance of single-track vehicles.

Several types of light vehicles have been proposed to address the above issues through either inline two wheels (i.e. motorcycle) with two supporting wheels or three wheels (tricycle). The first type still requires rider to keep balance in normal riding condition when the supporting wheels are retracted. Therefore, in general, it still requires complex skill to ride it. The second type is a compromising solution between car and motorcycle: It has three wheels to keep balance during slow or stop condition. At high speed some them can balance the vehicle via active tilt control. For example, in U.S. Pat. No. 5,765,846 (1998) to Braun from Daimler-Benz, U.S. Pat. No. 5,762,351 (1998) to Soohoo and U.S. Pat. No. 4,903,857 (1990) to Klopfenstein. Europe and Japan also granted quite a few patents on this area: 560,670 (European Patent Office) to Putin (1995) and U.S. Pat. No. 5,039,073 to Matsuura from Honda motor (Japanese Patent). This type of vehicles are self-balanced like cars. But they are heavier compare with motorcycles, more expensive to make due to their energy drain hydraulic active tilt control of the vehicle body and consume more power due to increasing of tire road friction from the extra wheel. The self-balanced vehicle Segway uses two wheels (left and right) with a dynamic balance to keep vehicle from falling forward or backward. (U.S. Pat. No. 5,971,091 to Kamen et al). The major limitation is its speed and distance between charges. Due to the centrifugal force during turn and high center of gravity, Segway cannot go fast during turn. That is why its top speed is less than 20 mph.

SUMMARY OF INVENTION

Various methods, apparatuses, and systems in which a single-track vehicle has a retractable auxiliary-support wheel assembly and a computer control system. In an embodiment, the single-track vehicle has an elongated body. The retractable auxiliary-support wheel assembly mounts on both sides of the elongated body. The computer control system analyzes signals from one or more sensors to dynamically balance the single-track vehicle.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 illustrates a block diagram of an embodiment of the vehicle steering assembly.

Figure 1:
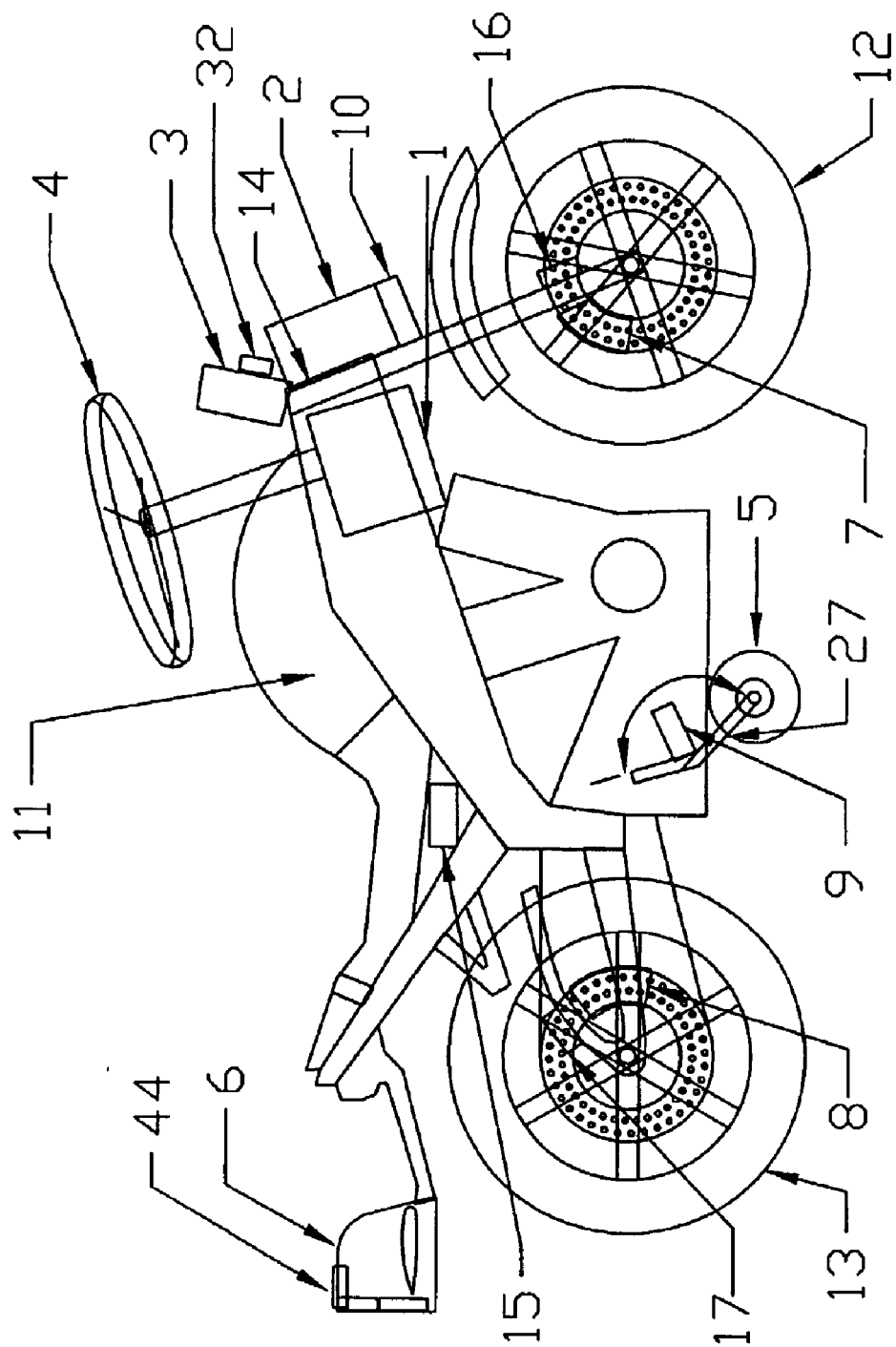
FIG. 1 illustrates a side view of an example embodiment of an intelligent self-balanced single-track vehicle.

DRAWINGS—REFERENCE NUMERALS 1 microcomputer
2 Brushless steering motor
3 Electronic flat panel display
4 Steering wheel
5 Right supporting wheel
6 Aerodynamic actuators
7 Front brake
8 Rear brake
9 Right supporting wheel actuator
10 Planetary steering gear
11 Vehicle body
12 Front wheel
13 Rear wheel
14 Steering assembly
15 Integrated roll, yaw, pitch sensors
16 Front wheel speed sensor
17 Rear wheel speed sensor
18 Steering motor encoder
19 Planetary gear for steering
20 Steering wheel encoder
21 Steering wheel motor
22 Steering angle encoder
23 Left supporting wheel
24 Left supporting wheel motor
25 Right supporting wheel sensor
26 Left supporting wheel sensor
27 Right supporting wheel arm
28 Left supporting wheel arm
29 Body lean angle
30 Road torque sensor
31 Microcontroller for brake subsystem
32 Proximity sensor
33 Closed control loop
34 Optimal control
35 Random disturbance
36 Digital recorder
37 Digital IO
38 Brake lever
39 Linear quadratic regulator
40 Steering wheel gear
41 Three-phase inverter for driving brushless DC motor
42 Real time OS (RTOS)
43 Optimal trajectory of single-track vehicle
44 Air speed sensors Various embodiments of methods, apparatuses, and systems of a self-balanced single-track vehicle are described herein. In the following description, some specific details are given to provide a thorough understanding of embodiments of the invention. One skilled in the relevant art will recognize, however, that the invention can be practiced without one or more of the specific details, or with other methods, components, algorithms, etc. In other instances, well-known structures, materials, or operations are not shown or described in detail to avoid obscuring aspects of the invention.

DETAILED DESCRIPTION OF THE ILLUSTRATED EMBODIMENTS

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figures are merely illustrative and are not necessarily drawn to scale or to the exact shape. Furthermore, it is to be appreciated that the actual devices utilizing principles of the invention may vary in shape, size, configuration, and the like, other than what is shown in the figures, due to different implementation, equipment, design tolerances, or other practical considerations that result in variations from one vehicle to another.

In general, a single-track vehicle whose dynamic balance is maintained by a computer controlled steering system is described. In an embodiment, the single-track vehicle includes a front wheel and a rear wheel attached to a body frame and a computer controlled steering motor. The computer controlled steering system receives a user's road intention through a steering wheel/handle bar as an input. It combines the inputs from a sensor subsystem for the state of variables of the vehicle to keep vehicle balance and faithfully follows the rider's intending path using an optimal control technique. The system further improves the safety and performance through an integrated computer control for braking subsystem, transmission, engine management and active aerodynamic for a global optimal status. The vehicle system achieves high energy efficiency and high maneuverability of a motorcycle, while freeing the rider from keeping the vehicle balanced. The vehicle system provides the rider an easy, truly car-like driving experience. The vehicle can be powered by gas, electric, hybrid or human sources. A battery may exist to supply power to the computer control system and actuators.

In an embodiment, a computer-automated dynamic control system to calculates the control of vehicle steering and leaning angles to achieve robust dynamic balance equivalent to the function of an experienced motorcycle rider. In an embodiment of the single-track vehicle, a rider can drive the single-track vehicle like a car: steering wheel for steering and foot peddles for acceleration and brake. The computer will take over the control of the vehicle balance just like an expert motorcycle rider. Computer control of a vehicle may do even better than an experienced human rider can do because the physical sensor subsystem may be vastly more sensitive and accurate in measuring the vehicle dynamic status and computer controlled actuators are so much more precise, fast and powerful in responding to any changes. The computer control may be much more consistent than that of human control, and yield a vehicle with significantly improved safety over traditional single-track vehicles (i.e. motorcycles).

Mechanical designs of ordinary single-track vehicles compromise vehicle performance by the limitations of human control: limitations of the accuracy of sensing the vehicle dynamic status, response time, and capable torque. New mechanical designs, which are not bound by the restrictions of human limitations, can improve vehicle performance significantly. The normal motorcycle front wheel, for example, is significantly narrower than the rear wheel in order to reduce steering inertia to a human controllable amount. As a result, the front wheel has less traction than the rear wheel. This is a serious compromise between steering control and riding safety because during braking, the front wheel produces about three times stopping power than the rear wheel due to motorcycle dynamics. Because it combines narrower geometry with the need for more stopping power, the front wheel is susceptible to losing traction and causing an accident.

On the other hand, an embodiment of a computer controlled system can be equipped with a powerful actuator for steering assembly so that the front wheel can be made the same width as, or even wider than that of the rear wheel for a safer brake. The integrated computer control system also optimizes overall performance in safety and easy of use via control of an integrated brake system, supporting wheels, transmission and motor management, replacing hands (steering by wire) and feet (computer controlled supporting wheels subsystem for stability for slow or stopped vehicles). The average rider can then enjoy the nimble handling and high fuel efficiency of a motorcycle with stability and easy to drive characteristics of a high performance car.

The system may provide rider comfort. Since the rider will lean together with the vehicle, the effective force (combination of gravitational and centrifugal forces) on the rider is aligned with the supporting seat, just like in normal motorcycle riding, with zero lateral force exerted on the rider. While in a car, centrifugal force throws drivers and passengers left and right during turns in a winding road. Another safety benefit of single-track vehicle is due to its light weight. During an accident that involves lightly weighted single-track vehicles, the impact force is much smaller than that of heavy cars. Suppose we have a dedicated lane for single-track vehicles, then road will become much safer place.

During low speed maneuvers and some other maneuvers that require extra stability during stopping and parking, the integrated computer control system can automatically deploy, for example, up to two extra supporting wheels for more robust balance. The system provides the rider with a car-like driving experience without having to focus on balance under riding/driving conditions.

An embodiment of the computer control may provide a fuel efficient, low cost, environmentally safe automated balance system for single-track vehicles, freeing riders from focusing on balancing the vehicle at any speed under substantially any driving condition.

An embodiment of the computer control may improve the vehicle in terms of system level performance, safety and ease of operation through an integrated computer control for steering, balancing, braking, transmission, active aerodynamics and auxiliary supporting wheels.

An embodiment of the computer control may improve vehicle stability from external disturbances such as sudden weight shift, wind gust, uneven road surface, slippery patchs etc, at all speeds.

An embodiment of the computer control may improve brake effectiveness through integrated control and providing automatic braking capability. The brake subsystem may prevent wheel skidding, and keep the vehicle balanced during hard braking, avoiding vehicle flip-over and fall. The subsystem also detects obstacles through sensors, then activates brake automatically to avoid collision.

An embodiment of the computer control may provide stability for a single-track vehicle when speed is too low for dynamic balance using, for example, two supporting wheels, automatically controlled by the computer, which monitors the dynamic state variables of the vehicle, so that riders don't have to use their legs for supporting the vehicle.

An embodiment of the computer control may push the performance envelope by exploring the superior response characteristics of computer control compared with human control: A computer control system may be more accurate and complete in detecting the dynamic status of the vehicle and more precise and rapid in processing the detected information and much more rapid in actuating the control. In this way the mechanical design compromises commonly found in a single-track vehicle can be removed, resulting in vastly improved performance in mechanical handling of a single-track vehicle system.

An embodiment of the computer control may further stablize the single track vehicle using active aerodynamic control. Similar to an airplane, an embodiment of the vehicle has an active rudder and aileron control at high speed. The control activates a rudder and ailerons according to the vehicle dynamic state to provide high performance and stability.

An embodiment of the computer control may have a computer with optimal control of the steering assembly using electric motor sensors, and supporting wheels for single-track vehicles. The steering of the vehicle may be achieved by a computer controlled electric motor. The computer, equiped with an optimal control algorithm, balances and leads to the vehicle to the optimal path defined by the rider's steering input. The vehicle system may be further improved by integrating all other controls, i.e. braking subsystem, motor management, supporting wheel subsystem etc, with the automatic steering control.

FIG. 1 illustrates a side view of an example embodiment of an intelligent self-balanced single-track vehicle.

Referring to FIG. 1, an embodiment of an intelligent vehicle may be composed of vehicle body 11, a suspended front wheel 12 that is attached to the front steering assembly 2, 10 and a rear wheel 13 that is attached to the body. The front steering assembly 2, 10 and the body are attached with a steering axle 14. A microcomputer 1 serves as the brain for the vehicle balance: it measures the vehicle's dynamic state with set of sensors 15,16,17, computes the steering torque in real time to control the body leaning angle and optimal trajectory according to user's steering wheel 4 input for maximum stability. The torque signal from the computer then executes electric motor 2 to control the steering assembly. In some cases, for example, two supporting wheels 5, 23 can be automatically deployed by the computer to give extra stability at very slow speed, stopping and starting, or parking conditions. At high speed, the two supporting wheels may be retracted into the vehicle body and active aerodynamic actuators 6 improve performance and stability of the vehicle via integrated computer control. The integrated control is applicable to single-track vehicles driven by a combination of front wheel and rear wheel, steering by front or rear wheel and powered by gas, electric motor and hybrid motors.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

Figure 2:
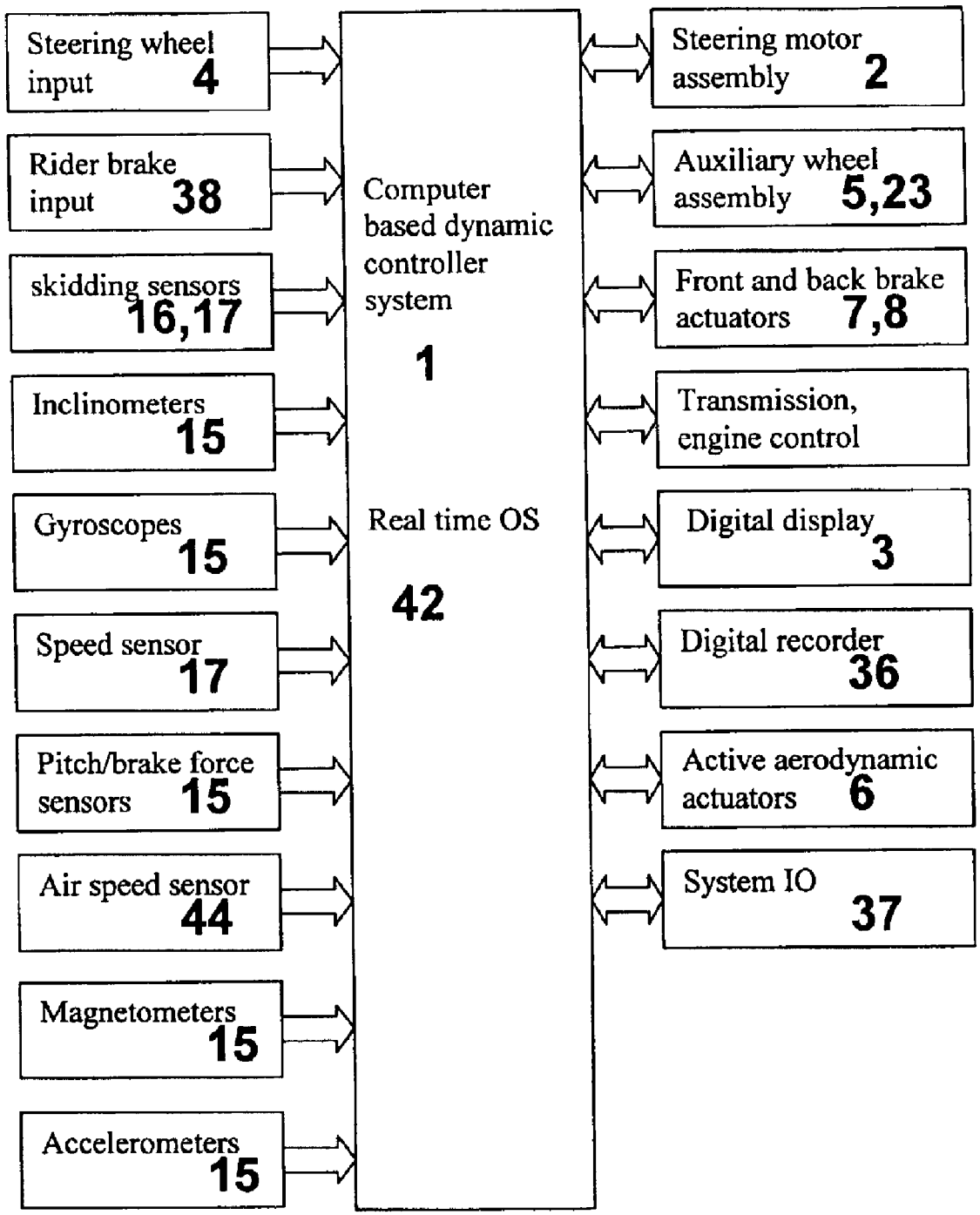
FIG. 2 illustrates a block diagram of an embodiment of a computer controlled steering system of self-balanced single-track vehicle.

FIG. 2 illustrates a block diagram of an embodiment of a computer controlled steering system of self-balanced single-track vehicle.

The auto balance, auto steering of the single-track vehicle can be achieved through an optimal control technique. The control technique may include an optimal control algorithm residing in a microcomputer or microcontroller, that calculates the multi-body dynamics of the vehicle. It also includes a set of sensors 15, 16, 17, 22 for measuring the state variables of the vehicle system, a force feedback steering wheel 4 for rider input, and a computer controlled electric motor 2 for exertion of torque on front wheel steering assembly 14.

The sensor subsystem 15, 16, 17, 22 measures the dynamic state variables of the vehicle system such as speed, steering, roll, yaw and pitch angles and their changing rates, as well as friction, propelling and braking forces on front and rear wheels. The yaw rate, roll rate and pitch rate can be measured using three orthogonal mounted gyroscopes. The three gyroscope sensors are integrated with a microcontroller, three MEMS accelerometers and three magnetometers to measure the three absolute angles for roll, yaw and pitch as well their changing rates and is available commercially. The other variables measured are front and back wheel speed 16 and 17 through two optical encoders and steering angle through optical encoder 22. In an embodiment, the vehicle uses two simpler incremental encoders to determine the angular rotation rates of the wheels. In an embodiment, the vehicle measures the absolute value of the steering angle. In an embodiment, the vehicle uses an absolute encoder to give the steering wheel's angle as well as the wheel's changing rate. An electric potential meter can be used to replace 20 for steering angle measurement with reduced accuracy, reliability and more temperature drift. The random torque exerted on the front wheel from the road is also measured for vehicle control by a force sensor 30 in FIG. 5 and realistic force feedback to the steering wheel. The measured real time data from sensors streams into the microcomputer for the calculation of the optimal steering angle, aiming to keep the vehicle balanced and following the rider's intended trajectory, defined by his/her steering wheel/handle bar input. The feedback control loop of the optimal control algorithm provides robust stability for all riding conditions including straight running, constant turning, sudden swerving, lane changing and slaloming under braking or acceleration conditions.

The dynamic state (i.e. speed, roll and yaw rate, steering angle, etc) of the vehicle is displayed on a monitor 3 in front of the rider. In addition, our display also show the information of what a normal vehicle displays: tachometer, speedometer, battery voltage, temperature gauge, turn signal, high/low beam, odometer/tripmeter, fuel gauge etc. Since a major portion of the vehicle may be controlled by computers, a flat panel liquid crystal display (LCD), totally replaces the traditional mechanical analog hands. A back lighted dot matrix super twisted nematic (STN) provides wide viewing angle, easily readable under all weather light condition. LCD display offers benefit of reducing vehicle weight, power consumption and system complexity compares with traditional display.

Its dynamic state vs. time may be stored in a non-volatile memory 36 for later analysis and record keeping. Similar to a black box for aircraft, the digital memory records continuously the most recent vehicle status (velocity, roll angle, roll rate, steering angle, engine status, brake force etc.) and user inputs (i.e. steering wheel angle, brake pedal pressure). The digital memory may have a "first in, first out" (FIFO) architecture. With this implementation, the most recent data is substantially always stored for book keeping. It can also be downloaded from vehicle digital IO 37 into off board computer for later analysis. Digital IO of the vehicle is also useful for system diagnostic and upgrade firmware.

Referring to FIG. 1, the energy efficient computer controlled intelligent single-track vehicle may include auxiliary supporting wheel assemblies and a computer control system. The single-track vehicle may have an elongated body 11 that produces a small aerodynamic drag. The auxiliary supporting wheel assemblies 5, 23 may mount on both sides of the vehicle body for static and low speed balance. The computer control system 1 for automatic dynamic balance of the single-track vehicle may use a linear or non-linear mathematical model of optimal control and an integrated control for the system brake to keep the balance of the vehicle while slowing down. The computer control system 1 for automatic dynamic balance of the single-track vehicle may also use active aerodynamics to modify balancing at high speeds as well as high wind conditions. The computer control system 1 for automatic dynamic balance of the single-track vehicle may also control the auxiliary supporting wheels 5, 23 and transmission, engine management.

The single-track vehicle may also include a front wheel 12, and a rear wheel 13 that attaches to the vehicle body frame 11 through a swinging arm suspension, a front assembly including a fork with telescope type suspension and a steering column 14. The front assembly and the vehicle body are attached at a revolute joint through the steering column. The steering and power can be controlled through different combinations of the front and rear wheels.

The single-track intelligent vehicle uses human-machine interaction and is designed to feel similar to driving a car. The single-track intelligent vehicle has a steering wheel 4 for vehicle direction control, foot pedals for acceleration, brakes, clutch (for manual transmission only), and a right hand operated handle for gear shift (for automatic or manual transmission).

The computer control system for automatic dynamic balance and system integrated control may have control software for sensing, processing and actuating of optimal control for the single-track vehicle, dynamic balancing, integrated braking, acceleration, transmission, engine control and auxiliary supporting wheels. The software may be executed by one or more digital microcomputers, ASICs, and/or microcontrollers. In an embodiment, the software may be a multi-task real time operation system for managing the software execution that allocates the CPU and memory resource for various controlling tasks. A steering wheel 4 for user provides an input signal as to the desired direction into the controlling computer. A steering wheel 4 may have force feedback to reflect the real road to front wheel interaction.

A sensor subsystem 15, 16, 17 measure vehicle dynamic states and vehicle-environment interactions and provides input signals to the computer control system for automatic dynamic balance. An electric motor 2 receives a control signal from the computer control system for automatic dynamic balance to turn the steering column. A set of actuators 9, 21 receive a control signal from the computer control system to execute the control signals for auxiliary supporting wheels.

The control software uses control models that are based on multi-body dynamics of the realistic vehicle physical descriptions and optimal control 34.

An advantage of the control software is the software calculates dynamic balancing for the vehicle with optimal control for the current use conditions, integrates that determination with feed back to optimize the vehicles stability, and follows the riders desired direction from the steering wheel input.

In an embodiment, the control software may include control models that are based on neural network such as Cerebella Model Articulated Control (CMAC) with adaptive and learning capabilities. In an embodiment, the control software may include control models that are based on fuzzy logic.

Thus, the computer control system receives input signals from sensors measuring the vehicle's dynamic status, then the computer processes the sensor's and user's inputs to control actuators to form a closed loop 33 control. The computer control system may achieve robust stability, even under the influence of random perturbation such as sudden weight shift, sudden wind gust, uneven road surface, slippery road patches.

In an embodiment, the computer control system may include an integrated control which can use different processing models ranging from centralized computing via a single powerful processor to distributed processing via many interconnected processors, each one dedicated to one or more specific controlling tasks. The computer control system may include computer hardware which contains a digital signal process in order to obtain efficient dynamic calculations for added control. The computer control system may perform a self-test on the computer hardware, memory, sensors and actuators.

The sensor subsystem may include the status of the vehicle which is measured by many sensors 15, 16, 17, gyroscopes for body pitch rate, yaw rate, and rolling rate, inclinometers for rolling angle, force sensors for steering torque and brake torque, speed sensors, slip sensors for wheel locking during brake.

The computer controlling the integrated brake system may direct the brake actuators 7, 8 with optimal force to front and back wheels to stop the vehicle in a controlled manner. The integrated brake system may include the brake actuators 7, 8 of front and back wheels that are linked with the controlling computer and sensor subsystem to prevent the wheels from locking or skidding as well as prevent the vehicle from loss of balance and flipping over. The integrated brake system may detect potential collisions in the vehicle's path through proximity sensors 32 and a computed trajectory, and the computer issues a control signal to activate the brakes and steers the vehicle away for automatic collision avoidance.

The computer control system may use a control algorithm for the deployment of the auxiliary supporting wheels 5, 23 at times such as low speed, when stopped, or when the dynamic balancing needs additional fixed balancing support. The auxiliary supporting wheels couple to computer controlled arms 27, 28 which are capable of being set at different angles. The linkage to the system computer so that the arm angles at the left and right side of the vehicle body can be set according to optimal values of the vehicle dynamic states, angle position sensors for computer servo control, and a fail safe mechanism for deployment of the supporting wheels in case the control system fails.

The control algorithm for the supporting wheel sends signals to the supporting wheel actuators 9, 21 with optimal deployment angles, reads angle sensor feedback to confirm that the correct angles have been set and that the supporting wheels have been deployed or retracted according to the system dynamic balance needs. In the control algorithm for the supporting wheel, when the vehicle stops on an uneven surface, then the computer senses the surface condition and deploys the supporting wheels 5, 23 at calculated angles to keep the vehicle body upright. When the rider stops the vehicle before an immediate sharp turn, the control algorithm for the supporting wheel communicates to the computer to actuate the supporting wheel arms to create a pre-lean in the direction of the turn before or when the vehicle starts to move. The auxiliary supporting wheels system may include a mechanism capable of fast deployment (during braking) and slower retraction speed (during start).

The integrated optimal control system may include an integrated active aerodynamic control that directs the aerodynamic actuators 6 for improving stability and performance according to the vehicle dynamic states, at high speed. The aerodynamic control allows the computer to take input from the vehicle dynamic status (speed, yaw rate, roll rate) and actuates a rudder and aileron control 6 to further stabilize the vehicle at high speeds and during turns. The integrated optimal control system uses a control algorithm to compute the optimal combination of engine speed and transmission ratio for vehicle performance and fuel consumption.

The integrated optimal control system may include a display 3 that shows the state of the vehicle, such as roll angle, steering angle, vehicle speed, engine rate, steering angle, transmission status, and supporting wheel status, using a flat panel LCD display. The display 3 shows the actual rolling angle vs. the vehicle rolling angle limit due to measured road traction and vehicle geometry, so that the rider can be informed to ride within the vehicle's limits in addition to the display may illustrate normal vehicle information such as engine speed, vehicle speed, battery voltage, and temperature. On the display, when the rider pushes the vehicle control too close to the vehicle's hard limit, the system issues a warning in terms of an audible signal and flashes a message on the display 3. (Example: sharp turn ahead, too fast speed).

The integrated optimal control system uses a safety control program for safety equipment, such as deployment of airbag, active restraints, collision sensors 32 which are linked to the controlling computer 1, and actuators for the safety equipment 7, 8.

The integrated optimal control system may include a non-volatile memory that continuously stores the most recent vehicle system status and user controls for a fixed period of time, so that the vehicle status and user control can be analyzed later for debugging and accident investigation.

The integrated optimal control system may include a digital IO system that performs input and output to outside computers, for firmware upgrade, system diagnostics and off-vehicle data analysis.

In an embodiment, the physical design of the single-track vehicle hardware is optimized for computer control characteristics, instead of human rider interaction. The single-track vehicle may include a solid enclosure with doors or hatch that can help provide protection against collision, weather conditions and wind.

Figure 3:
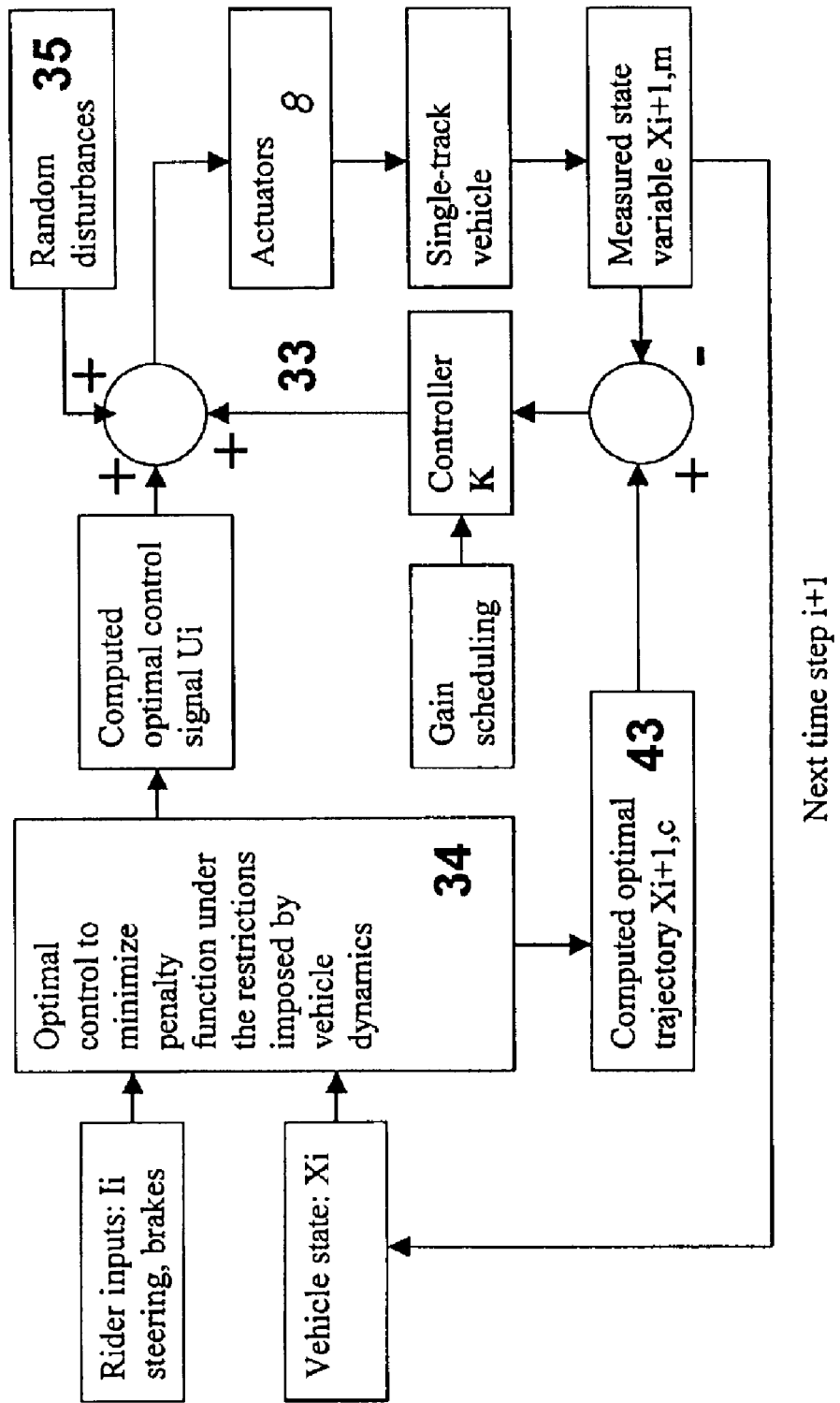
FIG. 3 illustrates a block diagram of an embodiment of a control chart for the control system with discrete time step, nonlinear closed loop optimal control.

FIG. 3 illustrates a block diagram of an embodiment of the control chart for the control system with discrete time step, nonlinear closed loop optimal control.

In an embodiment, the intelligence of the vehicle, in part, come from its computer optimal control algorithm (FIG. 3). Optimal control assists in mainataining stability during operation by use of closed control loop to make the vehicle stable. The vehicle may have a dynamical system described by a set of coupled non-linear second order differential algebraic equations (DAEs). The vehicle may be controlled so that it travels close to user-defined trajectories. The auto-balanced single-track vehicle achieves an optimal control with random disturbances 35 and statistical noise through a nonlinear control method. Motorcycle dynamic states can be represented by its yaw, roll and pitch angles, rotational speeds of wheels, steering angle and front and rear suspension deflections. From the dynamic behavior of multi-body dynamics of the vehicle, a set of coupled nonlinear second order differential algebraic equations for motorcycle state variables can be obtained. This set of DAEs determines the behaviors of the vehicle system. And they are called dynamic equations. Based on the dynamic equations, the microcontroller constructs an optimal trajectory 43 aiming to keep the vehicle stable, at the same time optimally following the rider-defined trajectory 34. Since the system is highly nonlinear, it is difficult to compute its optimal trajectory due to the restriction of real time and computer resources. Instead the microcontroller divides the system states into several smaller domains and linearizes the system using discrete time steps. The nonlinear optimal control problem becomes several linear quadratic regulators (LQR) 39, each for a portion of domain. The goal of the control system is to minimize a penalty function, which is designed to keep the vehicle stable and follow the rider's intended path as closely as possible. The feedback loop 33 of the control is very effective in reducing the impact of random perturbation from road imperfection, wind, modeling and numerical error and parameter inaccuracies. In an embodiment, the single-track vehicle uses an optimal control method having balance of inverted pendulum.

Other control methods, such as an artificial neural network (ANN), Cerebella Model Articulated Control (CMAC) in particular, and fuzzy control, can also be used to replace optimal control method to achieve similar objectives. The effectiveness of an ANN controller does not depend on detailed and accurate mechanic model of the vehicle. This can be a major benefit when the system is too complex to build an accurate model. An additional benefit of ANN is its adaptivity. The control behavior can be easily and quickly tuned to give optimal response under changing conditions. One example of it is weight shift of the vehicle. Suppose a load is shifted from one portion of the vehicle to other, the center of gravity changes. That impacts the vehicle dynamic behavior. By being able to adapt the change, the vehicle can quickly tune itself to the optimal stable dynamic states. The vehicle's dynamic behavior may depend upon training data.

The vehicle computer control performs many control tasks (i.e. dynamic balance, supporting wheel control, active aerodynamics, integrated brake etc.) with a real time operation system (RTOS) 42. The main purpose of RTOS is to prioritize and manage CPU and memory resources for different tasks. RTOS may employ a guaranteed time response so that higher priority tasks are done first under a required time schedule. For example, the integrate brake control and dynamic balance would be assigned as a highest priority task.

Figure 4A:
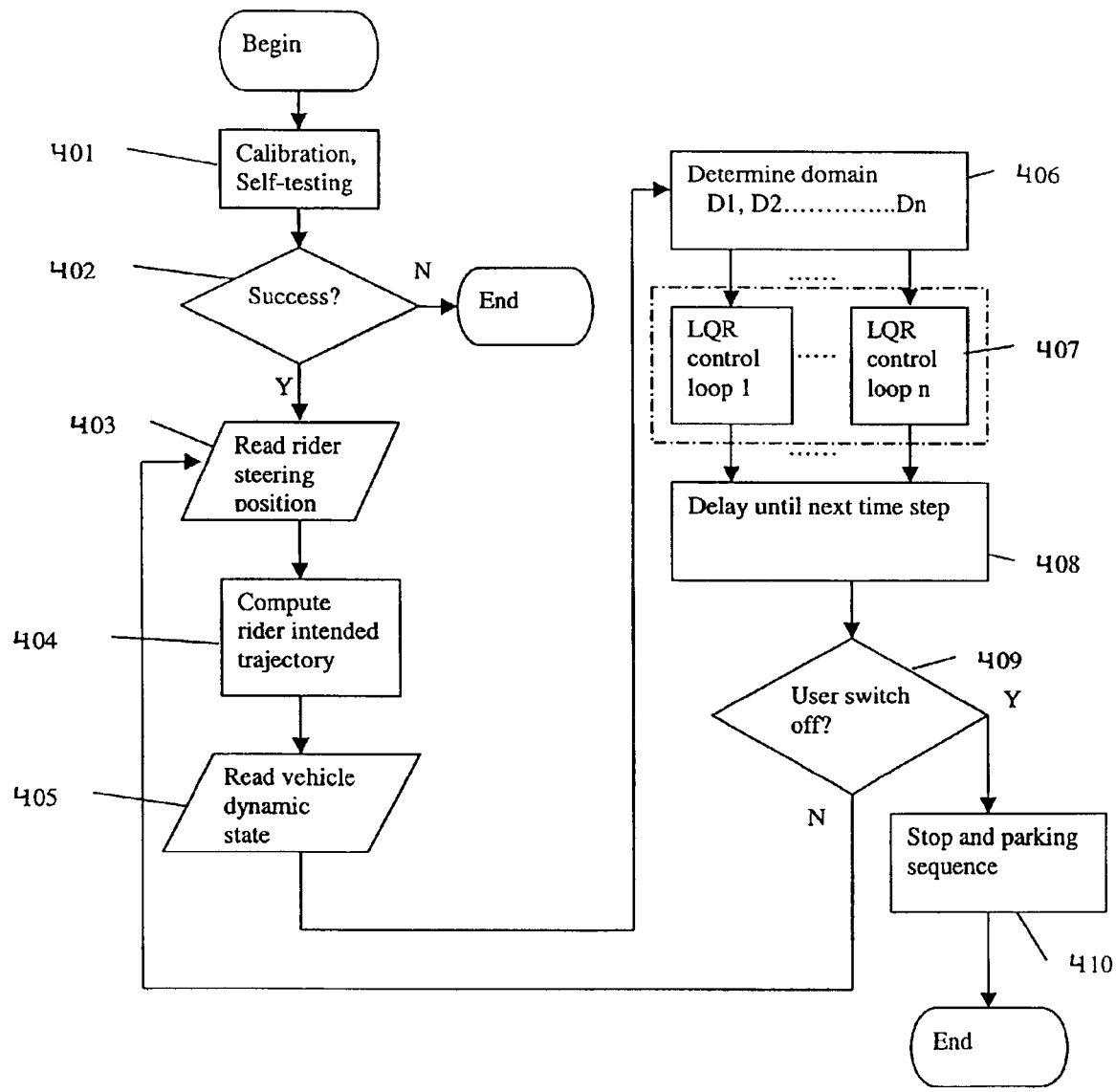
FIG. 4a illustrates a flow chart of an embodiment of the vehicle control system.

FIG. 4a illustrates a flow chart of an embodiment of the vehicle control system.

In block 401 the microcomputer calibrates the system. The calibration includes a home cycle of all encoders and absolute measurement using incremental encoders. The microcomputer also does a self-test for computer system, wire connections, sensors, and actuators. If the self-test is not successful the microcomputer aborts the system test and calls for service in block 402. In block 403, If the test is successful, the microcomputer reads steering wheel position from rider through an optical encoder. In block 404 the microcomputer computes the user intended trajectory using his/her steering information. In block 405, the microcomputer reads vehicle dynamic state such as roll, yaw and pitch angles and rates, vehicle velocity, vehicle's actual steering angle. The vehicle state then classified and assign to a domain in block 406. A specific linear quadratic regulator is called in block 407 where the microcomputer computes an optimal control and closed loop feedback stabilization as in FIG. 3. In block 408, the microcomputer delays until it is time for next time step synchronization and calculation. Then the microcomputer check the rider power switch in block 409. If user turns off his/her vehicle, the microcomputer will call stop and parking sequence in block 410, which evolves slowdown the vehicle, lower the supporting wheels, then turn off computer control system and vehicle.

Figure 4B:
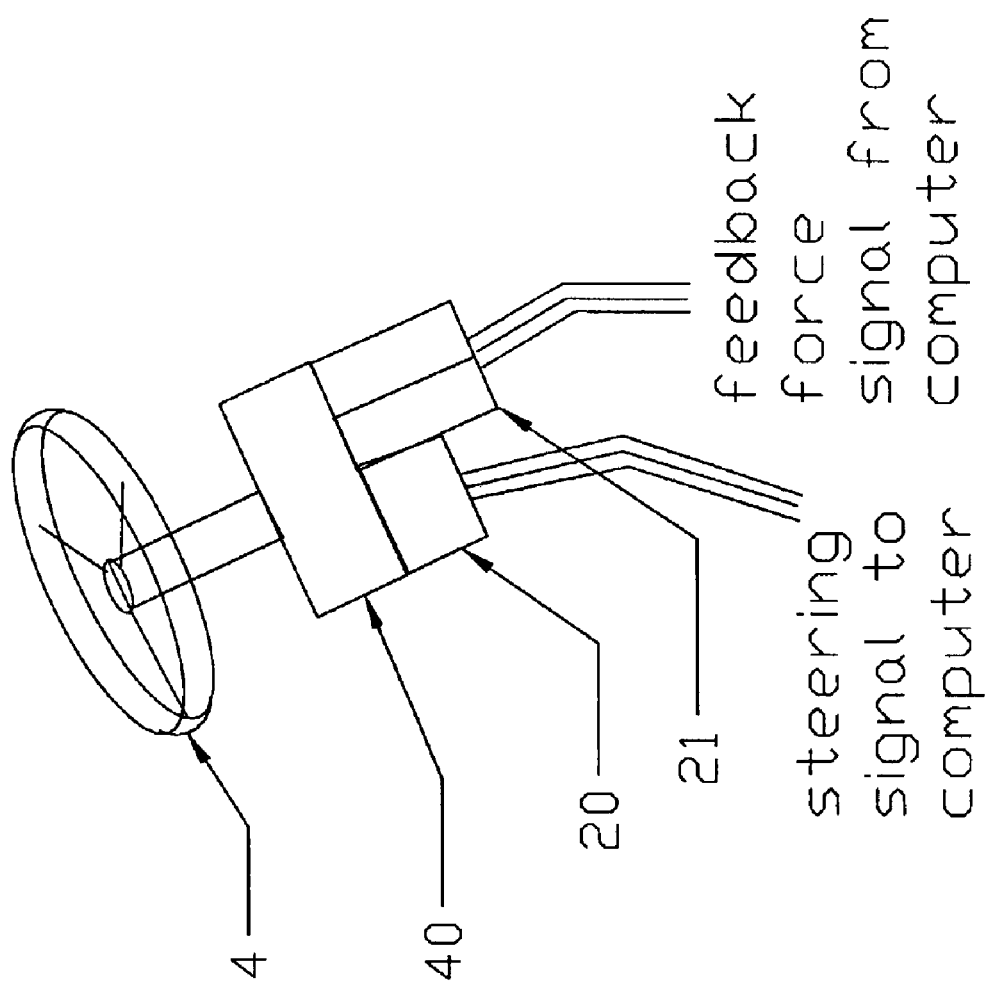
FIG. 4b illustrates a block diagram of an embodiment of the steering wheel/handle bar assembly of the user control.

FIG. 4b illustrates a block diagram of an embodiment of the steering wheel/handle bar assembly of the user control.

The steering wheel assembly may be mechanically isolated from the steering assembly (FIG. 4b). It communicates only with the controlling computer, transmitting the rider's desire for his/her intended path and sending a signal for road generated force feedback to the rider. Rider directional input in real time is geared up and digitized through an optical encoder 20 before been fed into the computer for control signal calculation. Encoder is a device that translates the steering shaft rotation motion into an electric signal. The optical encoder 20 offers great reliability and accuracy used by vehicle control. The steering subsystem may behave like a car's steering so that many riders who are already familiar with driving a car can instantly feel comfort in riding the vehicle. Since a typical car steering wheel can turn from −540 to +540 degree, the vehicle's steering wheel turn's more than 360 degree and the encoder has to be capable of encoding multi-turn signals. Since our steering wheel is not connected to a steering assembly and front wheel mechanically, the rider cannot feel random road force exerted on the front wheel. A force feedback may be added to the steering assembly to help the user feel like he or she is driving a conventional vehicle. The force feedback is created by an electric motor 21 and gear assembly. The motor exerts force to the steering wheel according to the road force measured by sensor 30 in FIG. 5 mounted on the steering assembly.

FIG. 5 illustrates a block diagram of an embodiment of the vehicle steering assembly.

The steering assembly (FIG. 5) may be controlled by a computer through a brushless electric motor 2 and planetary gears 19 for matching the desired torque and speed. The brushless DC motor is excellent in terms of reliability, efficiency and size compared with other types of electric motor. For example, 33 Watts of peak power may be sufficient for motorcycle steering. A brushless motor uses a speed sensor to generate the driving sinusoidal voltage to it's wiring connectors in the correct timing sequence. The actual steering angle is measured by an optical encode 22 mounted on the steering axle 14. Planetary gear reduces the normal speed of DC motor from typical 3000 rpm down to 30 rpm of typical vehicle steering speed and increases its steering torque at the same time. Planetary gear offers high reliability under large steering torque. The controlling computer continuously reads the encoder signal 22 for steering angle and outputs an optimal control signal sequence to the steering motor and gear assembly for the proper torque over real time to achieve the desired optimal path and state control. The motor and gear assembly then apply torque to steering axle 14 to achieve actual steering action.

Figure 6:
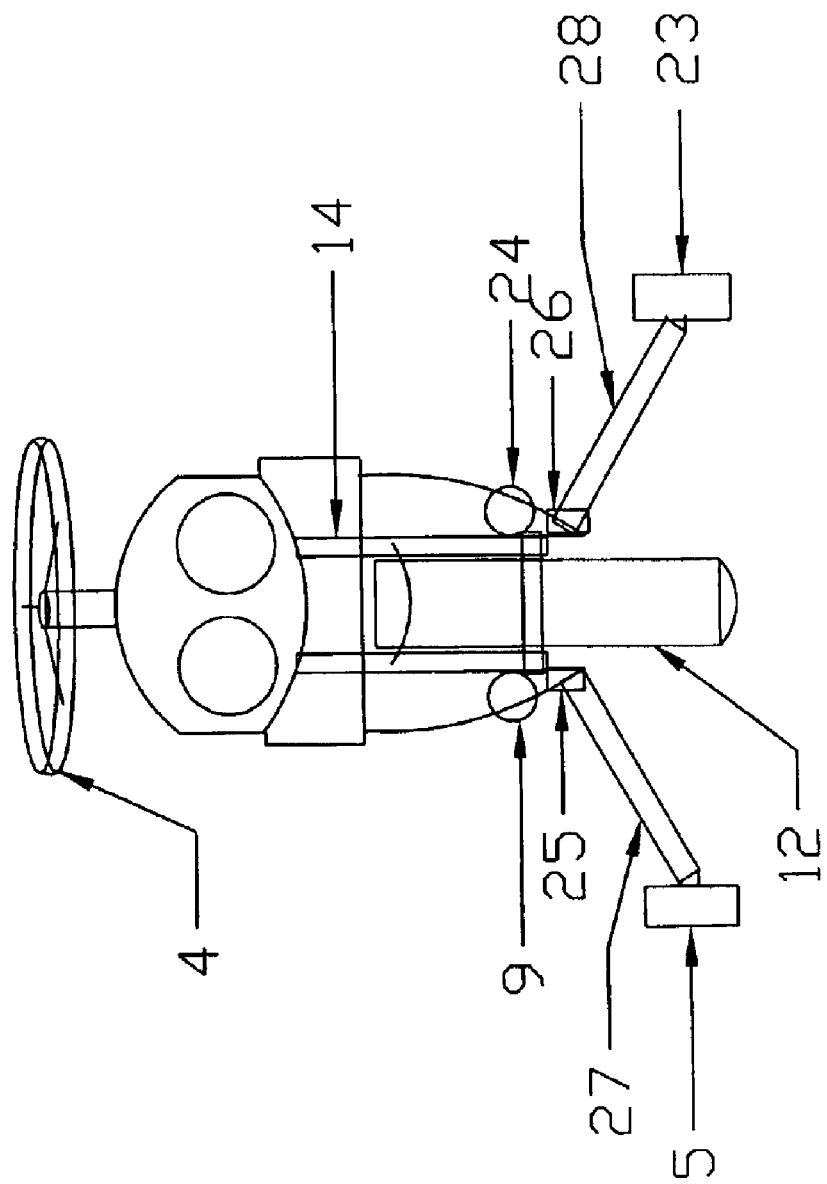
FIG. 6 illustrates a block diagram of an embodiment of the auxiliary supporting wheel assembly.

FIG. 6 illustrates a block diagram of an embodiment of the auxiliary supporting wheel assembly.

When the vehicle is too slow to be dynamically balanced, or during parking, the controlling computer automatically deploys one or more supporting wheels 5, 23 in FIG. 6 mounted along each side of the vehicle for keeping balance. The one or more independently controlled wheels can also be used during sharp U-turns, or during high speed turning for extra stability. Each of the supporting wheels has force sensors 25, 26 for feedback control into the main computer, and independent motors 9, 24 to guarantee the vehicle stability and that the main force is still distributed to front and rear wheels by adjusting supporting angle and steering angle. The motors 9, 24 also have built-in encoders to feed back the actual angles of the supporting wheel arms 27, 28 into the controlling computer.

Figure 7:
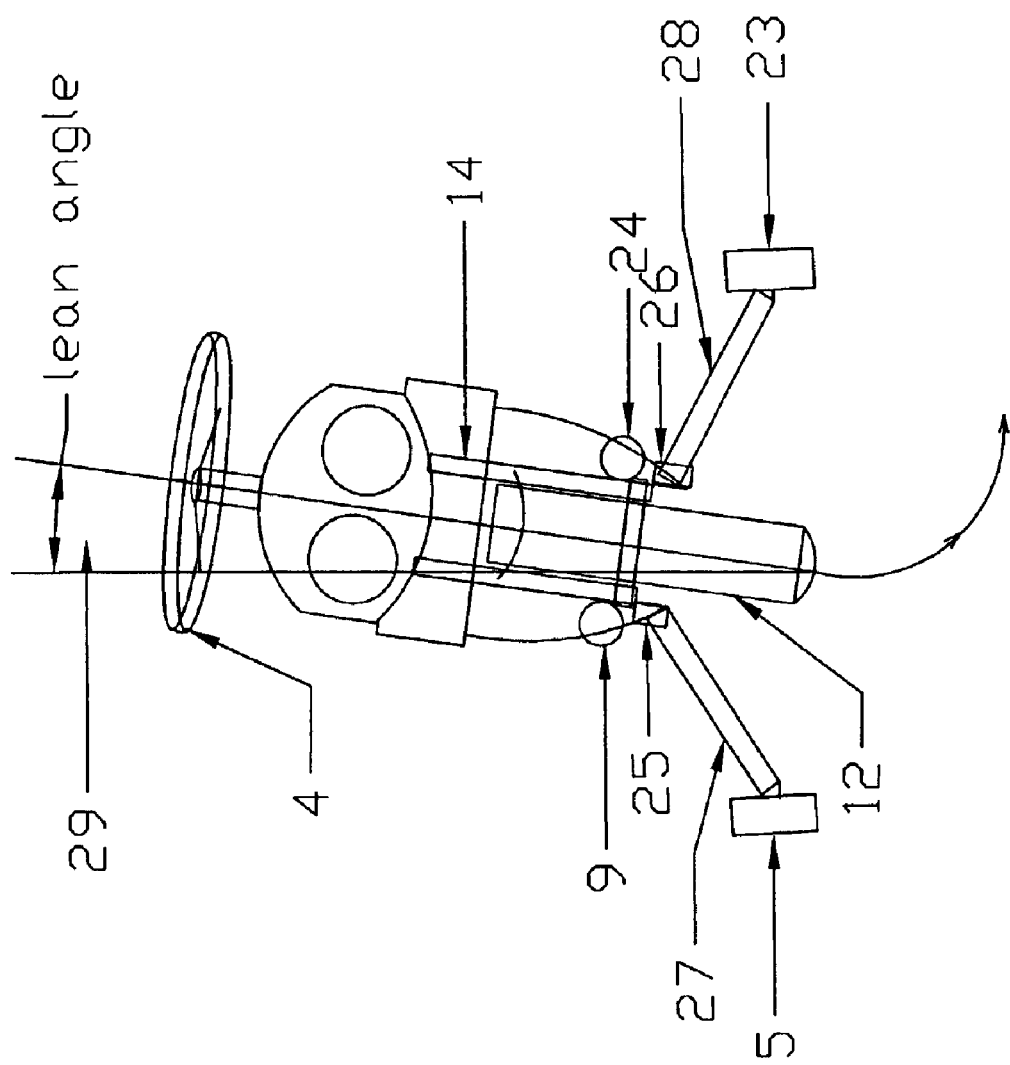
FIG. 7 illustrates a block diagram of an embodiment of one or two supporting wheel assemblies in pre-lean condition.

FIG. 7 illustrates a block diagram of an embodiment of one or two supporting wheel assemblies in pre-lean condition.

The vehicle body needs to lean at a small angle according to the steering wheel position during stops for immediate turning, resulting in a more optimal turning trajectory after the stop (FIG. 7). The computer system achieves this by reading the steering wheel position from steering wheel encoder 20, computing an optimal lean angle, and actuating supporting wheel motors 9, 21 to produce the correct amount of body lean angle 29.

Figure 8:
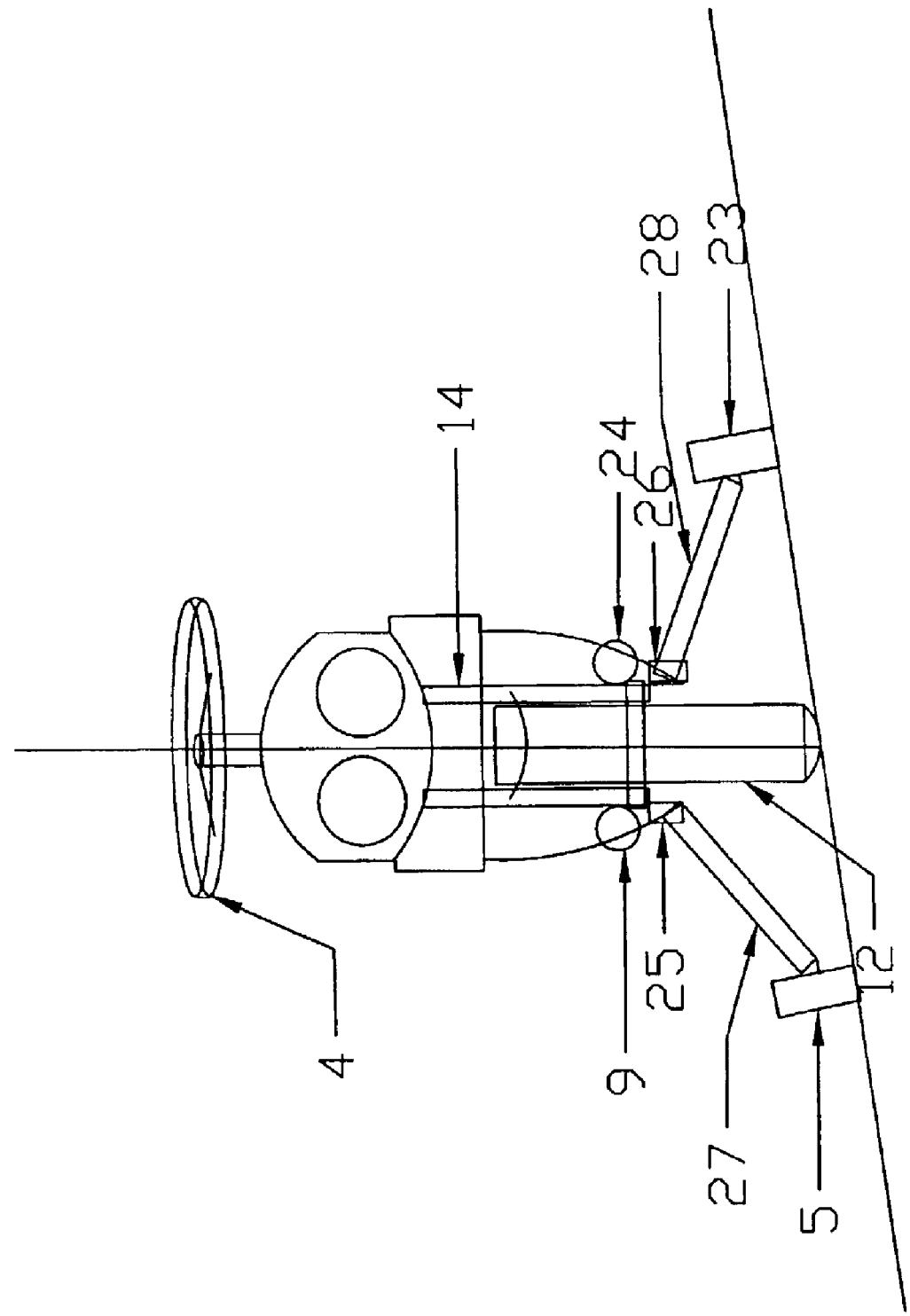
FIG. 8 illustrates a block diagram of an embodiment of another use for the supporting wheels.

FIG. 8 illustrates a block diagram of an embodiment of another use for the supporting wheels.

The arms 27, 28 of the supporting wheels may be independently controlled by the microcomputer to any angle. This capability can be useful for maintaining balance when the vehicle is parked on an uneven surface (FIG. 8). The computer reads the tilt information from an inclinometer mounted on the vehicle body 15, computes the necessary angles of the supporting arms 27, 28 and instructs the actuators 9, 24 to achieve an upright position even when the parking lot is uneven.

Figure 9:
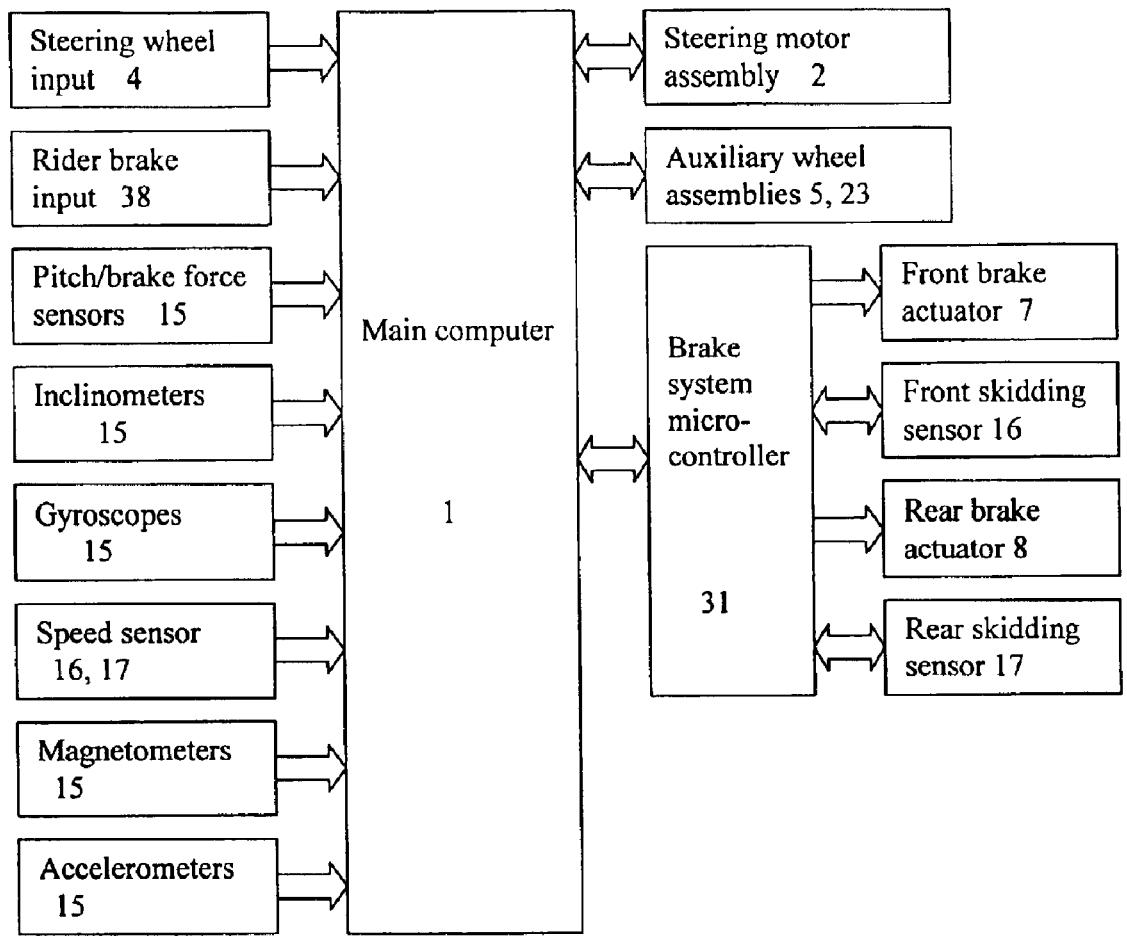
FIG. 9 illustrates a block diagram of an embodiment of integrated control for brake subsystem.

FIG. 9 illustrates a block diagram of an embodiment of integrated control for brake subsystem.

During braking, the system goes one step further than anti-lock brakes. The microcomputer senses the wheel spin status from the sensors 16, 17 in FIG. 1 mounted on front and rear wheels, and senses the vehicle body status for possible flip-over (pitch sensor in sensor group 15 in FIG. 1) or fall (inclinometer 15 in sensor group FIG. 1) during strong braking. The independent microcontroller 31 for brake control and the main computer together form a distributed control system. The skidding sensors mounted directly on front and rear wheels send signals directly to brake controller 31 and it directly controls the brake actuators for front and rear wheels for fast execution of an anti-lock function. At the same time main computer 1, which has the knowledge of vehicle status such as pitch angle, roll angle and steering angle, computes the optimal trajectory and maximum braking forces for front and rear wheels that will not destroy vehicle balance. It communicates the information to the brake controller for activating the brakes. Main computer 1 also generates an optimal trajectory under the brake condition and directs the steering assembly 2 to follow it. The main computer can also deploy supporting wheels with calculated angles in case the system balance cannot be met by dynamic balance alone. In this way, the vehicle can achieve the shortest possible stopping distance, in the direction intended by the rider. At the same time the vehicle is still kept in a stable status by dynamic balance and possibly with up to two side supporting wheels.

The vehicle can be equipped with an enclosure, air conditioning, and audio system, just like cars. They offer comfort under different weather condition and crash protection.

The computer controlled self-balanced motorcycle can inherit all the benefits of single-track vehicle: power consumption reduction, greenhouse gas reduction, nimble maneuverability, great saving on road and parking resources, and is cheap to make and maintain compare with automobile. At the same time it offers the stability and simply to operate equally to 4 wheel passenger cars. If widely adapted it will have a large positive impact on environment, road and parking resource and oil usage for major metropolitan area and densely populated third world countries.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. For example, most electronic hardware and computer chip operations can be emulated by software. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
    a single-track vehicle with an elongated body;
    a retractable auxiliary-support wheel assembly mounted on both sides of the elongated body;
    a computer control system to analyze signals from one or more sensors to dynamically balance the single-track vehicle; and
    a computer controlled steering system to receive a user's road intention through a steering wheel, the computer controlled steering system to combine the user's road intention input and signals from the one or more sensors to keep the single-track vehicle balanced and to follow an intended path of the user.

2. The apparatus of claim 1, wherein a first sensor comprises a gyroscope.

3. The apparatus of claim 1, wherein a first sensor comprises an accelerometer.

4. The apparatus of claim 1, wherein a first sensor comprises a magnetometer.

5. The apparatus of claim 1, wherein the computer control system balances the single-track vehicle based upon an optimal control algorithm.

6. The apparatus of claim 1, further comprising:
    a computer controlled braking subsystem integrated with the computer controlled balance system to maintain balance on the single-track vehicle while braking.

7. The apparatus of claim 6, wherein the computer controlled braking subsystem directs the operation of one or more brake actuators on a front wheel and a back wheel based upon optimal force calculations.

8. The apparatus of claim 1, further comprising:
    an electric motor controlled by the computer controlled steering system, wherein a sensor detects a position of the steering wheel to provide an input signal into the computer controlled steering system and a control signal from the computer controlled steering system controls a steering column.

9. The apparatus of claim 1, further comprising:

a rudder; and an aileron, the computer control system to control position and alignment of the rudder and the aileron to further stabilize the single-track vehicle.

10. The apparatus of claim 1, wherein the computer control system to control steering and leaning angles of the single-track vehicle based upon the signals from the one or more sensors.

11. The apparatus of claim 1, wherein the computer control system to receive an incline surface condition from the one or more sensors and to deploy the retractable auxiliary supporting wheel assembly at calculated angles to keep the vehicle body upright.

12. An apparatus, comprising:

a single-track vehicle with an elongated body and a handle bar;

a retractable auxiliary-support wheel assembly mounted on both sides of the elongated body; and a computer control system to analyze signals from one or more sensors to dynamically balance the single-track vehicle, wherein the computer control system also receives the user's steering intentions from the handle bar to steer the vehicle along the user's intended driving path while maintaining the balance of the single track vehicle.

* * * * *